(12) United States Patent
Mead

(10) Patent No.: US 8,009,190 B2
(45) Date of Patent: Aug. 30, 2011

(54) OPTICAL SCATTER CORRECTION FOR FILM SCANNERS

(75) Inventor: Terence William Mead, Ware (GB)

(73) Assignee: Cintel International Limited, Oaemead (GB)

( * ) Notice: Subject to any disclaimer, the term of this patent is extended or adjusted under 35 U.S.C. 154(b) by 1527 days.

(21) Appl. No.: 11/387,214

(22) Filed: Mar. 23, 2006

(65) Prior Publication Data

US 2007/0076275 A1    Apr. 5, 2007

(30) Foreign Application Priority Data

Sep. 6, 2005   (GB) .................................. 0518119.3

(51) Int. Cl.
*H04N 3/02*   (2006.01)
(52) U.S. Cl. ......................................................... 348/98
(58) Field of Classification Search ..................... 348/98, 348/97, 96
See application file for complete search history.

(56) References Cited

U.S. PATENT DOCUMENTS

| | | | |
|---|---|---|---|
| 5,079,678 A | | 1/1992 | Parker |
| 5,335,158 A | | 8/1994 | Kaplan et al. |
| 5,479,273 A | * | 12/1995 | Ramsbottom ..................... 359/9 |
| 5,565,958 A | | 10/1996 | Kaplan |
| 5,847,754 A | * | 12/1998 | Thornton ......................... 348/97 |
| 6,034,721 A | * | 3/2000 | Mangeat et al. ................ 348/97 |
| 6,108,132 A | * | 8/2000 | Itoh ........................... 359/485.04 |
| 6,157,438 A | * | 12/2000 | Kaus ................................ 355/41 |
| 6,515,775 B2 | * | 2/2003 | Ori .................................. 359/12 |
| 6,542,179 B1 | * | 4/2003 | Kurtz et al. ..................... 348/97 |
| 7,177,050 B2 | * | 2/2007 | Mead ............................. 358/2.1 |
| 2002/0005940 A1 | * | 1/2002 | Hatada et al. .................. 355/55 |
| 2005/0134726 A1 | * | 6/2005 | Parulski et al. ............... 348/373 |
| 2009/0066819 A1 | * | 3/2009 | Ando ............................ 348/254 |

FOREIGN PATENT DOCUMENTS

| | | |
|---|---|---|
| EP | 0659013 | 6/1995 |
| GB | 2370439 | 6/2002 |

OTHER PUBLICATIONS

J.D. Millward, "Telecines", TV and Video Engineers Reference Book, Chap 39, Butterworth and Heinemann, ISBNO-7506-1-21-2, pp. 39/1-39/11.
GB0518119.3 Search Report, Nov. 9, 2005.

* cited by examiner

*Primary Examiner* — Lin Ye
*Assistant Examiner* — Amy Hsu
(74) *Attorney, Agent, or Firm* — Wolf, Greenfield & Sacks, P.C.

(57) ABSTRACT

A film scanner of the type which uses diffuse illumination and an array sensor such as a line array or area array CCD includes an integrating optical element in the form of an integrating sphere to provide diffuse illumination to film. The diffuse illumination ensures that light is provided to film at a range of angles thereby improving the light level reaching the array sensor from film that has been scattered by defects such as scratches thereby reducing the visibility of such defects. A lens is provided at the exit aperture of the integrating sphere so as to define a particular area of the surface within the integrating sphere from which light that is not scattered by film is derived. The area has a lower reflectivity than the remainder of the integrating sphere thereby increasing the amount of light derived from scratches that reaches the sensor to further reduce the visibility of scratches. An additional light source can also be provided at the area of the integrating sphere so as to increase the visibility of scratches to produce a separate signal by which a main image signal may be corrected.

10 Claims, 6 Drawing Sheets

OPTICAL SCATTER CORRECTION FOR FILM SCANNERS

FIELD OF THE INVENTION

The invention relates to the scanning of film such as cinematographic film to produce electrical signals corresponding to the images stored on the film. One type of film scanner is a telecine; a type of film scanner which converts film images to television signals. The invention is equally applicable, though to film scanners that convert images to digital data of any suitable format.

BACKGROUND OF THE INVENTION

Telecine or film scanning equipment used to produce such signals from cinematographic film have been known for many years, and are described for example in "TV and Video Engineers Reference Book" Chapter 39 Butterworth and Heinemann ISBN 0-7506-1021-2. There are two main types of film scanner: diffuse light illumination, and spot scanning. The former uses a diffuse light source to illuminate a frame of film and optics to image the illuminated frame on to a light detector, such as a line array or area array CCD detector. Spot scanning systems use a flying spot of light to successively illuminate points of film. Light transmitted by the film is collected by light collection optics and converted to electrical signals by a detector.

Known telecines or film scanners that uses a scanning "spot" light source include the known Ursa™ or C-Reality™ telecines of Cintel International Limited. The illumination and light collection systems of the C-Reality™ telecine comprises a Cathode Ray Tube (CRT) which produces a raster scan that is imaged onto the film by an imaging lens group. Light passing through the film is modulated by the colour and density of the film at each location or pixel scanned, this light being subsequently analysed into its red, green, and blue components. Lenses then collect the light from the film and apply it to the Avalanche Photo Diode sensors. A dichroic mirror separates the received light into blue, red and green components. The three electrical colour signals are then passed through electronic processing circuits, converted into a television signal format on digital data and provided as output signals.

A known system of the type using spot scanning, described in GB-B-2,370,439, collects light that is scattered by scratches on the surface of, or other deformities in or on, the film. Such scratches cause scattering of the light, which would then be lost from the optical system that collects the light and cause a reduction in the signal received by the photo sensors. By collecting this light the visibility of the scratches in the resultant electrical images is much reduced.

The ray collection of this known system uses an integrating sphere or cylinder to collect all light from film (both scratched and unscratched areas). This method collects substantially all angles of light rays from the film. The light collection system when disposed in a film scanner has the advantage that light transmitted by film and imaged onto one or more image light sensors is transmitted in the usual manner, whereas light scattered by scratches is collected within the internally reflecting cavity and detected by the scratch light sensor. The signal produced by the scattered light sensor can be used to compensate the signal produced by the image light sensors to reduce the visibility of a scratch or other defect causing scattering.

We have appreciated, though, that such light collection techniques cannot work with diffuse illumination scanners such as CCD array scanners. This is because the film, in CCD scanners, is illuminated with diffuse light and imaged by an optical system onto a CCD array. This imaging process requires that the CCD array is at an image focus of the film so that each portion of the film is imaged uniquely onto the CCD array. Accordingly, techniques such as using integrating spheres to capture light from film cannot be used.

SUMMARY OF THE INVENTION

The invention is defined in the claims to which reference is now directed. An embodiment of the invention comprises a diffuse illumination film scanner of the type using an array sensor, such as a CCD array, in which an optical integrator is used as the diffuse illumination source so arranged as to provide diffuse illumination to film. A focusing arrangement then images the light from the film onto the array sensor in known fashion.

The use of an optical integrator such as an integrating sphere or integrating cylinder ensures that film is illuminated from a wide range of angles. Light impinging on the film and transmitted through the film is focused onto the array sensor. However, light scattered by imperfections on the film such as scratches or dust could be scattered so as not to be captured by the imaging system thereby showing on the resultant image as a visible scratch. By using an optical integrator to provide the diffuse light source, the wide range of angles means that light impinging from the film from a wide angle, if then scattered by optical imperfections, may still be captured by the imaging system. The difference in intensity between light transmitted straight through film and light scattered by imperfections on the film is thus reduced making the scratch or other imperfection less visible.

In a first aspect of the invention, the optical integrator includes a lens at an exit of the integrator and adjacent the film to be imaged. The lens may be referred to as an illumination lens and is so arranged that it substantially relays an image of the imaging lens pupil onto a portion of the internal surface of the optical integrator. This arrangement ensures that light which is not scattered by film (but is transmitted through the film) is derived from only a portion of the internal surface of the optical integrator. In contrast, light which reaches the sensor that is scattered by film (such as by imperfections) is derived from a different area of the internal surface of the integrator. In consequence, the reflectivity of the internal surface of the integrator at the two different areas can be so adjusted that the contributions to the image from scattered and unscattered light are substantially the same, thereby reducing the visibility of imperfections in the scanned image.

In the first aspect, the reflectivity of the different areas of the optical integrator may also be adjusted by various means to allow dynamic changing of the relative contributions to the image from scattered and unscattered light. This can be achieved by varying the relectivity of all or part of the different areas of the interior surface.

In a second aspect of the invention, an additional light source is used to supplement one or more light sources used for producing diffused light from the optical integrator. The additional light source is so located with respect to the imaging lens that most of the light from the additional light source is at a narrow range of angles to the normal with respect to the film plane. This light will result in an image on the array sensor that suffers the greatest loss of quality due to any scatter from imperfections on the film. Accordingly, the signal arising from illumination using this light source produces a signal which shows the imperfections and can therefore be used as a compensation signal for images derived using the normal light sources. Used in conjunction with the first aspect, the additional light source is located in a region that is an image of the imaging lens pupil.

A film scanner embodying the invention is preferably a film scanner that produces a digital data output. Preferably, the scanner produces a 2K output (that is 2048 by 1556 pixels). The film scanner may equally be a telecine for converting film images to television signals, with an analogue or digital output.

BRIEF DESCRIPTION OF THE DRAWINGS

An embodiment of the invention will now be described, by way of example only, and with reference to the accompanying figures, in which.

DESCRIPTION OF EMBODIMENTS OF THE INVENTION

The embodiments of the invention described are area array film scanners using a CCD area array sensor for converting film images to electrical signals. The main purpose of the embodiment is to convert cinematographic film to digital images using any known image format such as JPEG. It is noted, though, that the invention could apply to other array type film scanners such as line array scanners or other sensor arrays, though CCDs are the preferred choice.

A known CCD film scanner will first be described with reference to FIG. 1 which shows a diffuse light source 10 which illuminates film 12 the image of which is imaged via an imaging lens 14 onto a CCD area array 16. Of course, only the main functional components are schematically shown and the film scanner naturally includes further physical devices such as a film advance mechanism for moving the film past the light source, power supplies, output electronics to process the signal from the CCD sensor and so on. Such arrangements are known to the skilled person and may not be described further.

Figure 1:
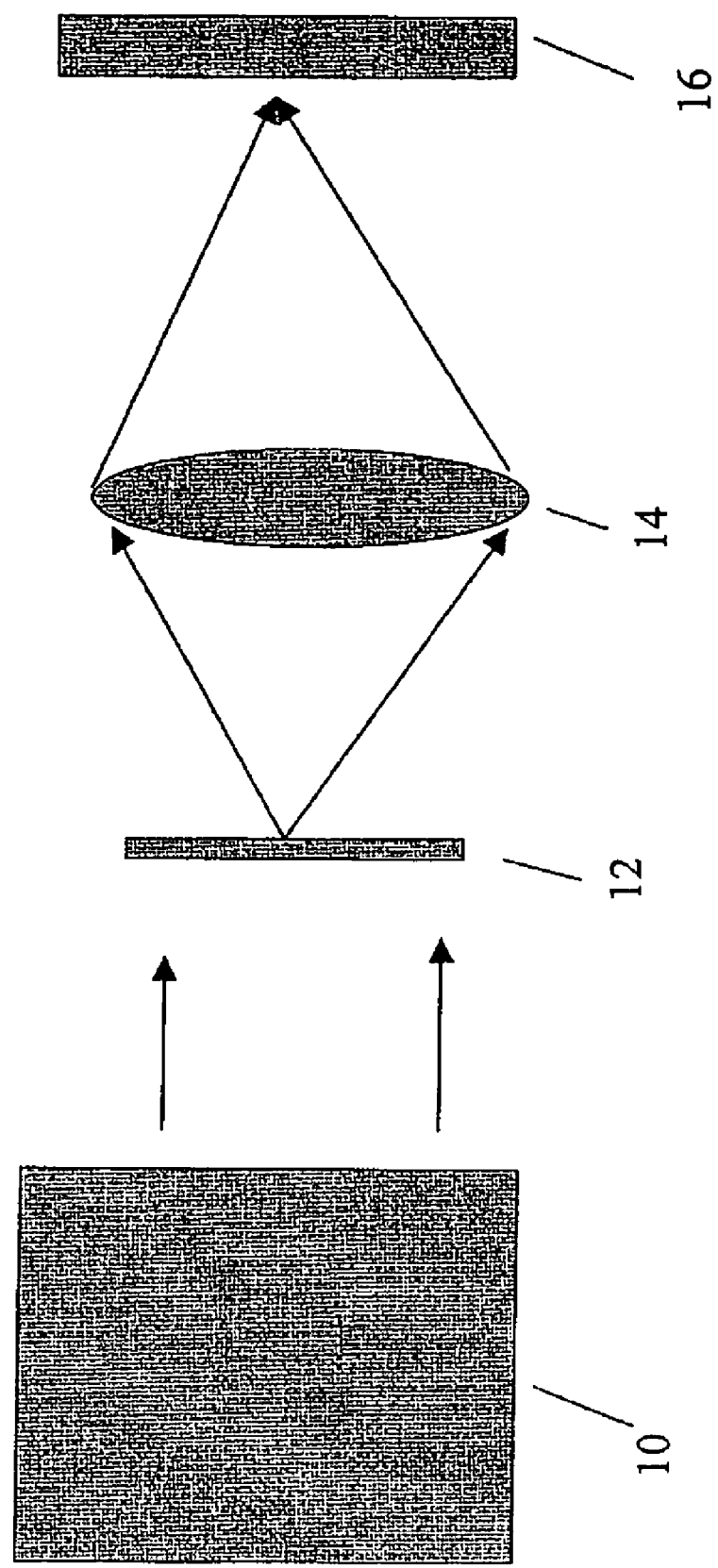
FIG. 1: is a schematic view of a known CCD area array film scanner.

As shown in FIG. 1, the CCD sensor 16 is at an image of the film 12 using the imaging lens 14. Of course, the imaging lens may comprise a group of lenses and is shown schematically as a single lens for simplicity. There is a one to one correspondence between points on the film plane and points on the CCD sensor.

In the event that no light is scattered by any imperfections on film, then the light source 10 can simply be a diffused light source such as an incandescent bulb with a diffuser. However, a degradation of the image results from scattered light due to any imperfections such as scratches on film, as shown in FIG. 2.

Figure 2:
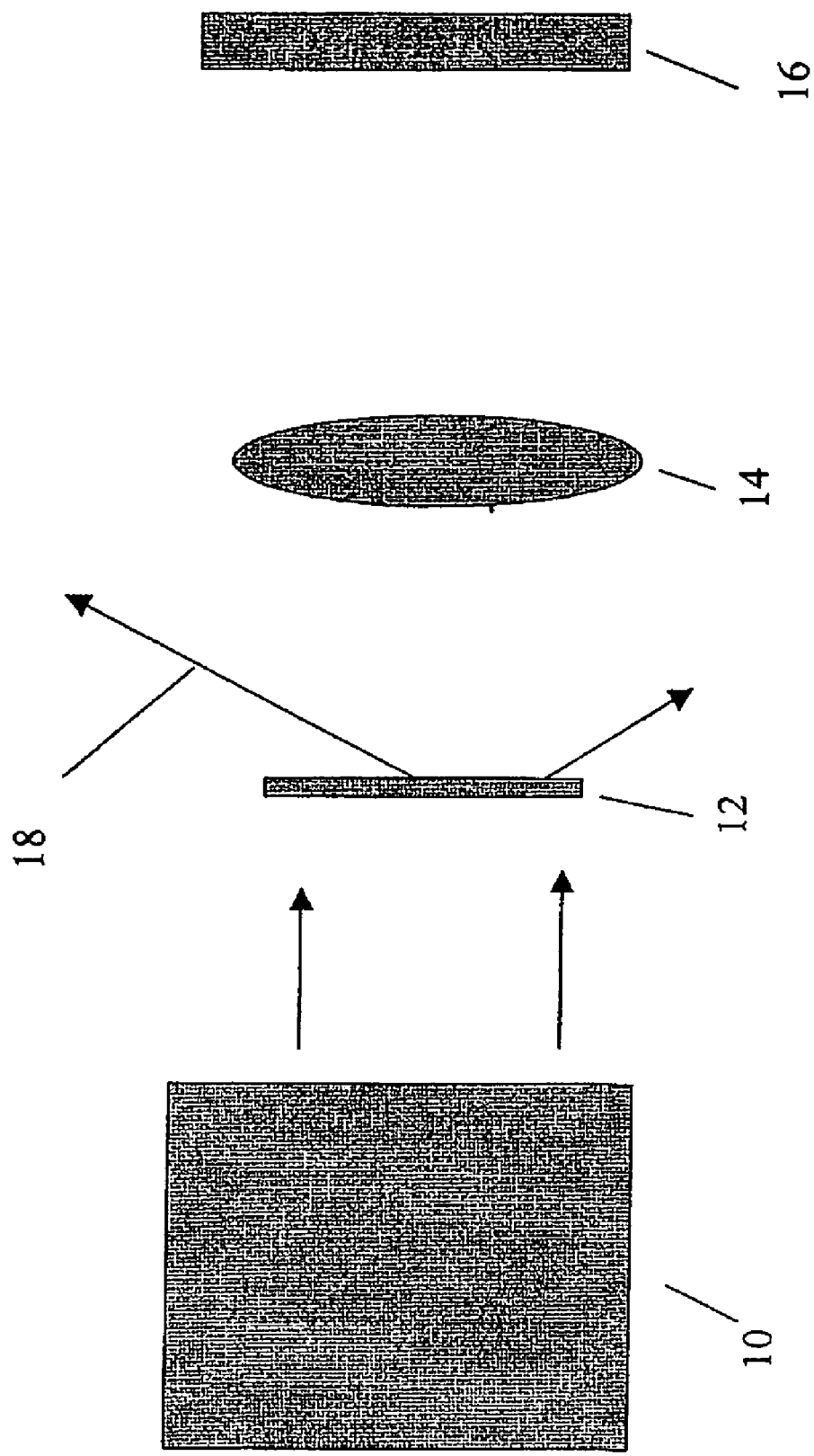
FIG. 2: shows the CCD area array film scanner of FIG. 1 and the effect of light scatter from imperfections on the film.

The arrangement of FIG. 2 is the same as that of FIG. 1 and like components are numbered with the same numbering. As can be seen, any imperfection on film that causes scatter can cause rays 18 to scatter at an angle so that they are not captured by the imaging lens 14 and therefore do not reach the sensor. As a consequence, these areas of film will produce less light falling on the sensor and so will appear as dark patches on positive film or as light patches for images from negative film. Since the above-mentioned diffuser will illuminate the film with light rays from a range of angles this will cause some of the scattered light to reach the imaging lens, hence reducing the degradation due to scratches to an extent.

Figure 3:
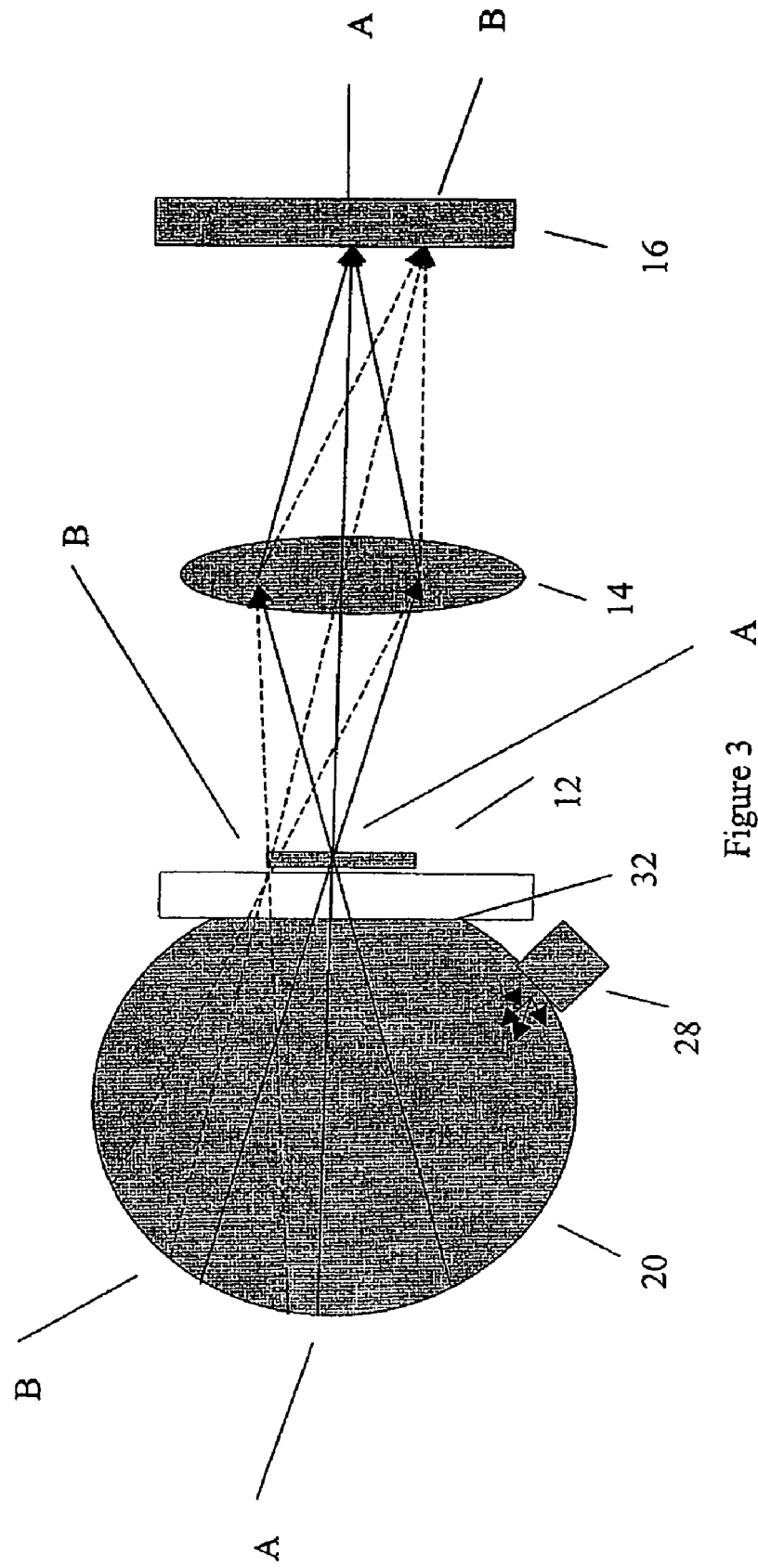
FIG. 3: is a schematic view of a film scanner incorporating an optical integrator in the form of an integration sphere as used in the invention.

A film scanner embodying the invention is shown in FIG. 3. The film scanner comprises film 12 held within a gate mechanism (not shown) and imaged onto an area array CCD 16 using an imaging lens 14, as previously described. The light source, though, includes an element referred to as an optical integrator. In the embodiment, the optical integrator is an integrating sphere 20. The integrating sphere is a known optical element, which comprises an internally reflective sphere typically with a white diffusive inner coating. The term integrator is used as, in a sense, light entering the sphere at an entry point is integrated in a sense that after multiple reflections, the light at any point on the surface is a summation of all the light within the sphere and is reflected at all possible angles. To introduce light into the integrating sphere 20, a main light source 28 is provided. It is noted that the light source is arranged to be on a portion of the sphere nearer the exit aperture 32 of the sphere than the side opposite the exit aperture. The reason for this is that this reduces the amount of light that would be received by the film direct from the light source, thereby improving the diffused nature of the light, which reaches the film. It is noted that the main light source 28 may in practice be three separate light sources, such as one each for red, green and blue or any other combination, such as cyan, magenta and yellow. The main light source may thus be three separate LEDs mounted in the same location or at different locations around the integrating sphere.

The operation of the film scanner using a main light source 28 comprising separate red, green and blue LEDs is as follows. Sequential "scans" of an image frame are conducted by first illuminating the integration sphere 20 with the red LED. The light imaged onto the CCD array causes charge to accumulate in the CCD, which is then clocked out and converted by electronics including an analog to digital converter and amplifiers in known fashion to produce an image signal. Next the green LED only is illuminated, charge accumulated and a signal derived and lastly, the blue LED only is illuminated and a signal derived from the CCD sensor. As a result, three separate images of the film frame are created, one each for red, green and blue light to form a colour signal.

The same result may equally be achieved by using a white light source as the main light source 28 but this would then require the light imaged by imaging lens 14 to be split into three separate components. This can be achieved by simply using a filter wheel to sequentially filter the light for red, green and blue light onto the CCD array. Also, a beam splitter could be used to provide three separate light components to three different CCD arrays. The choice of using three separate different colour LEDs is preferred as this reduces the number of mechanical or optical components required thereby achieving high quality scans without increasing the cost of the whole scanner.

As can be seen from the ray tracings shown in FIG. 3, light reaching the CCD array 16 from the film 12 is derived from light reflected from the interior of the integration sphere at a range of angles. For example, light from the centre of the film frame is imaged at a point A on the CCD sensor and is derived from an area A on the integration sphere surface. Similarly, light reaching a point B on the CCD sensor is derived from an area B on the interior surface of the integration sphere. However, this applies only to light, which reaches the CCD sensor that has not been scattered by the film. Any light from area B that has been scattered by film will not reach point B on the surface of the sensor and so would not be detected. However, because any imperfection on the film is likely to result in scattering by a large angle, light from a different area on the interior surface of the film, which impinges upon point B on the film, may be scattered through a large angle and imaged in precisely the direction so as to arrive at point B on the film. The advantage of the integration sphere can thus be seen, with such a wide range of angles of incident light it is likely that there will be light from an appropriate incident angle such that light scattered by an imperfection will reach the appropriate point on the CCD sensor. Because the imaging lens 14 ensures there is a one to one mapping of points on the film 12 to the CCD sensor 16, then only light from a given point in the film can reach a corresponding given point on the sensor. The effect of scattering due to scratches and other imperfections is thereby reduced and the output quality signal improved. The interior of the sphere can be considered to have two areas: one including all of the regions where unscattered light originates from for any location on the film, and the other being the area which never images directly through any part of the film to the imaging lens. Correction could be provided by providing different illumination from each of these areas. This can be by varying reflectivity or by providing differential light sources.

Figure 4:
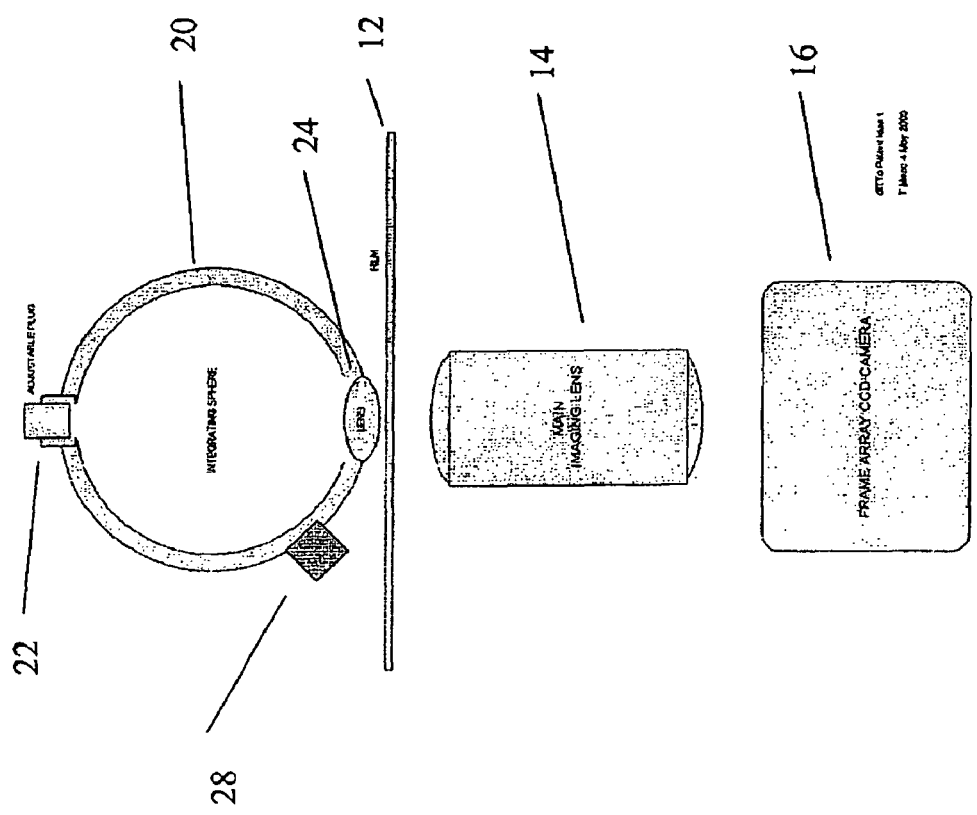
FIG. 4: is a schematic view of a first embodiment of the invention.
Figure 5:
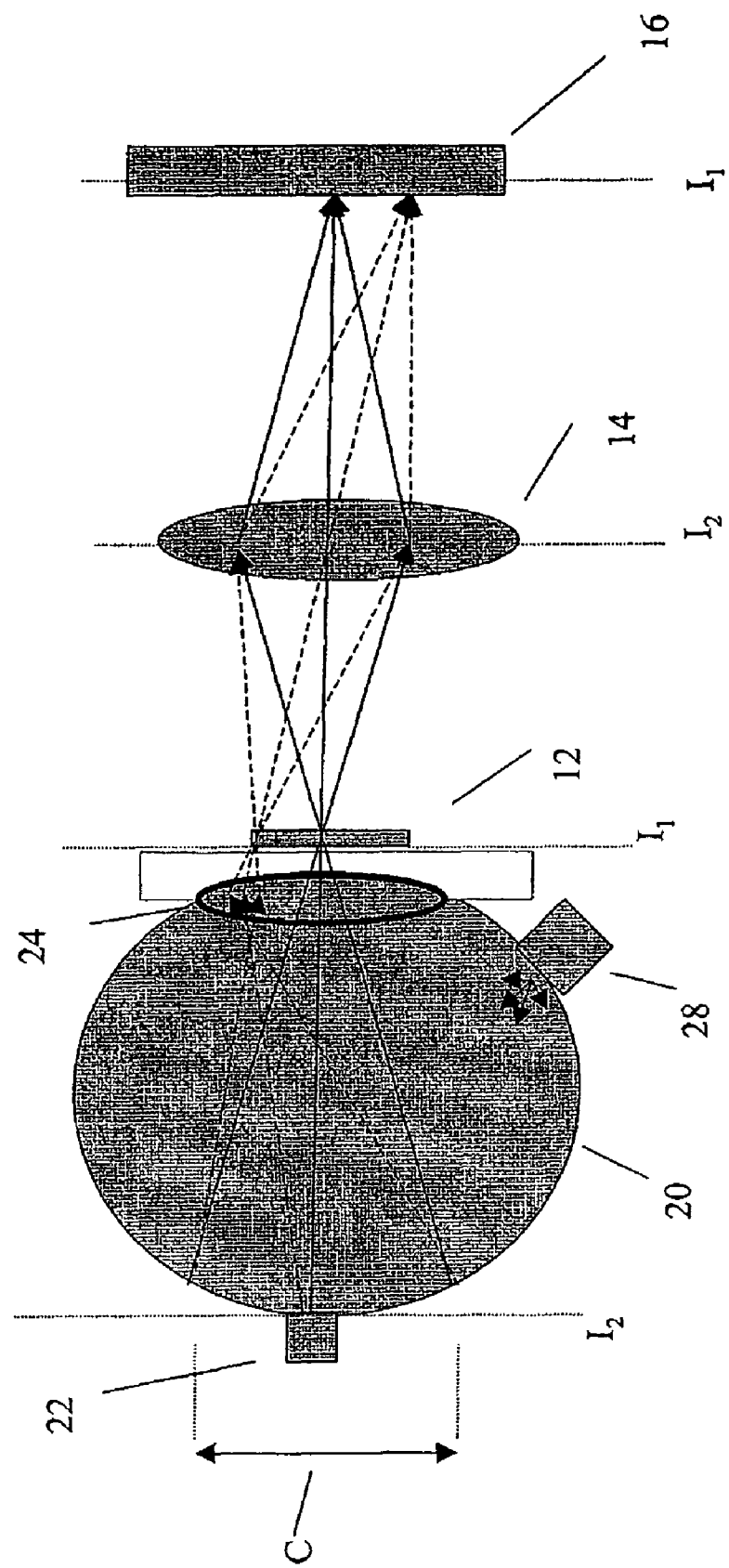
FIG. 5: is a schematic view of the embodiment shown in FIG. 4 showing the ray tracing of light.

A first embodiment of the invention is now described in relation to FIGS. 4 and 5. The arrangement of FIG. 4 is shown with the components previously described vertically, rather than horizontally, but comprises the same numbered components, namely an integrating sphere 20, which is arranged along with a main light source 28, in the form of one or more LEDs, to provide diffuse illumination from a wide range of angles to film 12 held in a gate mechanism. Imaging optics 14 produce an image of the film frame 12 onto a frame array CCD camera 16. These components are as already described. In addition, in the first embodiment, an additional lens 24 is provided at the exit aperture of the integrating sphere 20. This is so arranged that the imaging lens is imaged onto the back part of the integrating sphere, thereby defining an area on the sphere from which light is accepted by the imaging lens. The additional lens 24 also ensures that uniform illumination of the image is provided at the film plane from the area on the sphere defined by the range of angles accepted by the imaging lens even if there is variation in the reflectivity of the area from which light is accepted. Accordingly, an adjustable portion of the surface of the integrating sphere in the form of an adjustable plug can be provided within the area from which light is accepted for illumination of the film. This adjustable portion allows the overall reflectivity of a particular area of the integrating sphere to be changed thereby achieving an overall change in illumination of the whole film frame, rather than just a portion of the film frame, as would be the case in the absence of the additional lens 24. Of course, the additional lens 24 could be provided as a group of lenses, but it is preferred that a single lens is used so as to have the plane of the film 12 as close as possible to the exit aperture and additional lens 24 of the integrating sphere.

The principles of operation of the illumination arrangement for the film scanner of the first embodiment can be understood with respect to the schematic diagram of FIG. 5. The like components are numbered with the same numbers as in FIG. 4 and will not be repeated here. As can be seen, shown in dashed lines, there are two sets of image planes. First, the imaging optics 14 provides an image of the film 12 at the CCD sensor 16 and so the film and CCD sensor are at complimentary image planes $I_1$. In addition, the integrating sphere lens 24 is arranged so that the imaging lens 14 has an image on the rear surface of the integrating sphere 20 shown as area C. Accordingly, area C at the rear of the integrating sphere and the imaging lens 14 are at second complimentary image planes $I_2$. In consequence, for light to be accepted by the imaging lens 14 it can only have come from a range of angles defined by the exit aperture lens 24 of the integrating sphere, namely from the area shown as area C being a circle projected onto the rear of the integrating sphere 20. This applies for any light passing straight through the film without scatter.

As previously mentioned, any variation in reflectivity within the area defined by the additional lens 24 on the rear of the integrating sphere (area C) will result in an overall change in illumination of the film frame 12, but not any variation in illumination across the film frame. This is because the film frame is located at a position as close as possible to the integrating sphere lens 24 and so every point within the area C provides a contribution to illumination of all positions on the film frame 12. It is thus possible to vary the overall illumination from the patch C onto the film frame just by varying a portion of the reflectivity of the patch C by using the plug 22 as previously described.

It can now be seen that the illumination arriving at the CCD sensor from any portions of film that are defective in some manner such that light is scattered at the film plane is likely to have come from an area other than the area C shown. This is because light from an angle outside this range when scattered at the film plane can be scattered such that the angle allows the light to be imaged by the imaging lens 14 onto the sensor 16. The arrangement effectively provides two different areas of the integrating sphere surface: a first area (shown as area C) which provides illumination to give a signal substantially for non-scattered light and the remainder of the integrating sphere (everything except area C) which provides illumination to give a contribution to the signal substantially for light that has been scattered. As scattered light will tend to be attenuated, the contribution will be slightly lower than for the non-scattered light. To render the defect less visible, therefore, the overall reflectivity of the area C is chosen to be slightly lower than that for the remainder of the integrating sphere thereby giving substantially equal contributions to a point on the sensor 16 from a given part of the image for scattered and non-scattered light thereby rendering any defect less visible.

The variation in reflectivity of the area shown as area C could be by permanently painting the whole area C with a paint of different (lower) reflectivity than the remainder of the integrating sphere. This would be a permanent fixed arrangement. A preferred embodiment as shown is to use an adjustable surface portion in the form of a plug which allows the plug to be retracted thereby allowing light to enter a cavity created by the retraction of the plug reducing the amount reflected. Other possibilities include having a removable section C which can be replaced with parts of different reflectivity. A fine grid could also be used to cover the area. If using the plug arrangement, this could be motor driven by motor operation if required.

The arrangement of the first embodiment thus reduces the visibility of scratches, blemishes, dust and other imperfections on the image by an optical arrangement so arranged that the difference between contributions from scattered and unscattered portions of film is reduced.

Figure 6:
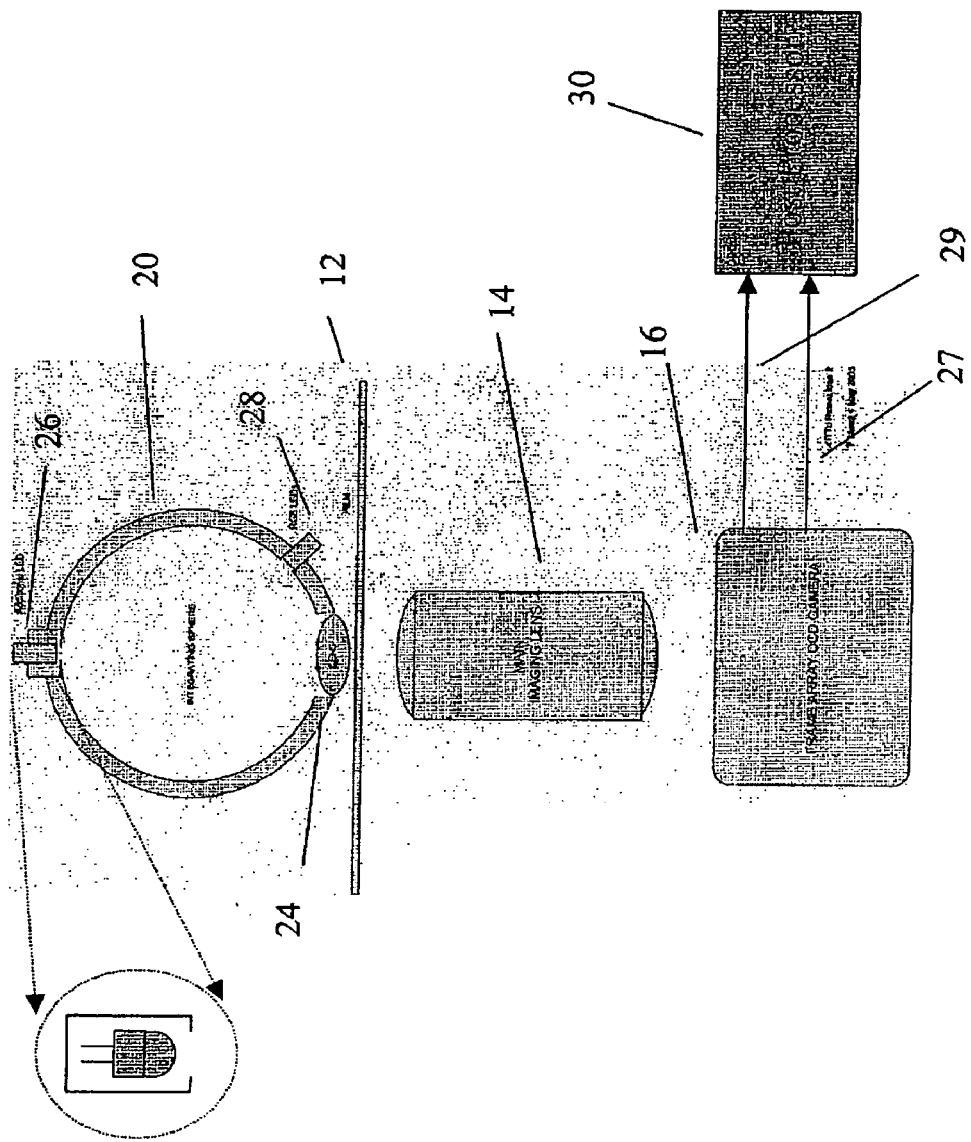
FIG. 6: is a schematic view of a second embodiment of the invention.

The second embodiment uses very similar techniques to the first embodiment but additionally provides the ability to perform further electronic processing to further reduce the visibility of imperfections. The second embodiment shown in FIG. 6 comprises the same components as previously described the description of which is as before and will not be repeated here. In addition, an additional light source in the form of an LED 26 is provided at the rear of the integrating sphere. The purpose of the additional light source is to provide illumination of the film frame in a manner, which does not reduce the visibility of defects so as to provide a reference signal to provide correction of the image signal. In addition, the second embodiment uses the same technique as the first embodiment in that the additional light source, which may be termed a reference light source, is housed in a housing with an aperture so arranged that the reflectivity of the area at the rear of the integrating sphere is reduced in the same manner as previously described in relation to FIG. 5. It is noted that the embodiment of FIG. 6 includes the integrating sphere lens 24 again arranged so that the main imaging lens is imaged onto the rear area of the integrating sphere 20 as previously described in relation to FIG. 5. In consequence, the area at the rear of the integrating sphere where the reference light source 26 is located contributes predominantly to light reaching the sensor that has not been scattered. Accordingly, an image produced when illuminated with the reference light source 26 will enhance visibility of scratches and other defects, rather than reduce them. In contrast, the light from the main light source 28 will be reflected and provided at all angles to the film and so provide a contribution from scratched and unscratched areas which may be balanced by varying the reflectivity of the rear portion as previously described and so will substantially reduce the appearance of scratches. The signals derived in these two different ways can then be used to electronically reduce the appearance of blemishes yet further in various known fashions described later.

The operation of the scanner is that the main light source 28 which preferably comprises three separate LEDs one for each of red, green and blue is illuminated once for each colour and the frame array CCD sensor is clocked out to produce three separate scans for red, green and blue. Then the reference light source is illuminated and a further scan clocked out of the CCD sensor, which may be termed a reference scan. The colour of the reference light source could be any colour, but a green LED is chosen to be the same as the green LED in the main light source. Other options would be to use a white light or even an infrared light source. Using an infrared light source has advantages in that infrared is not substantially attenuated by film and so would produce a good reference signal showing scratches and other defects, but has the disadvantage of requiring higher specification optical elements to be able to cope with the wide range of wavelengths.

Using the preferred choice of a green reference LED the "fourth" colour scan which provides a reference produces an image which we can call a "scratch" image. As previously explained, most of the light from the scratch LED is at narrow angles to the normal and will therefore produce a green signal with a large effect from scratches, whereas the signal from the main green LED is substantially a wide angle and is not effected by scratches very much. By comparing these two signals, it is possible to extract a scratch signal (constant x scratch signal—constant x green signal) that substantially represents the effect of scratches only. This signal can be used in a number of ways, first by subtracting the scratch correction signal from each of the three-colours it is possible to remove much of the residual effect of most fine scratches and dust Secondly, the effect of larger scratches and dust can be corrected by image substitution techniques using the scratch correction signal to initiate the substitution. This can be done within the film scanner itself or a data output can be provided to downstream post processing equipment 30 as shown. The image substitution can replace the damaged part of the colour images with, for example, one or a combination of the following wellknown techniques: a preset level such as grey, a spatially adjacent pixel, the average of surrounding pixel, the pixel value from a previous or subsequent frame or the average of both, an intelligent choice taking into account image motion and so on. These techniques are well known and in effect the scratch signal is used as a "flag signal" as described in various literature.

To facilitate post processing two signals can be provided from the film scanner an image signal on image bus line 27 and a scratch signal on image bus line 29 so that the post processing techniques mentioned above can be implemented in a dedicated post processor or general purposes computer.

Whilst described in relation to an integrating sphere, it is noted that the technique could be applied using other integration optical elements such as integrating cylinders. When using an integrating cylinder, a line array sensor could be used. In the second embodiment when using an integrating cylinder, the additional reference light source could be provided by a line of LEDs along the rear of the cylinder, or by a slit at the rear of the cylinder and light introduced through that slit from a further light source such as an incandescent light source or even a further integrating cylinder with a slit adjacent to the main integrating cylinder. In such an arrangement, the vertical scans would be provided by relative movement of film and line array CCD, rather than by clocking out an area array as in the present embodiments.

An advantage of the present embodiment of the system over known systems which uses infra-red sensing of the scratches, is that the known infra red system relies on the fact that the colour film dyes do not substantially affect the infra red transmission, whereas the blemish reduces the transmission and so can be detected. However this system does not work with black and white film because the inherent silver content in the black and white emulsion reduces the infra transmission. In the present embodiment the method of forming a difference between a narrow angle illumination and a relatively diffuse light source, as achieved in either the first or second aspect, works equally well with black and white film.

In a more extreme case of film scratches, the outer emulsion layer of the film can be removed. Suitable choice of the colour used for blemish detection, in the present embodiment, can result in satisfactory detection of these extreme scratches. For example, a colour negative film may have the magenta dye as it's outer layer. If this dye layer is removed then the red and blue images will be substantially increased, but the green image will only be decreased by the scattering of light from the scratch. A green additional light source for the scratch channel will therefore operate in the normal fashion and detect the scratch despite this serious damage to the film. In this case the simple subtraction of the scratch signal will not suffice and the method of image substitution is preferred.

The invention claimed is:

1. A film scanner of the type comprising a diffuse source of illumination
   and an array sensor for producing electrical signals representative of an image on film, comprising:
      an illumination arrangement to provide diffuse illumination of film;
      imaging optics arranged to image film illuminated by the illumination arrangement onto the array sensor;
      wherein the illumination arrangement and imaging optics are arranged such that the illumination arrangement provides light at a range of angles to film so that light scattered by imperfections on film is imaged by the imaging optics onto the array sensor; and
      wherein the illumination arrangement and imaging optics are arranged to produce an image of a pupil of the imaging optics within the illumination system, the illumination level from said image of the pupil being variable relative to the illumination level from outside said image of the pupil.

2. A film scanner according to claim 1, further including an illumination lens arranged substantially at an image plane of the imaging optics.

3. A film scanner according to claim 1, wherein the illumination arrangement comprises an optical integrator.

4. A film scanner according to claim 3, further including an illumination lens so arranged between the optical integrator and a film plane as to image a portion of an interior surface of the optical integrator onto the imaging optics.

5. A film scanner according to claim 4, wherein the portion of the interior surface is arranged to have a different reflectivity to the remainder of the interior surface of the optical integrator.

6. A film scanner according to claim 5, wherein the portion of the interior surface is arranged to have variable reflectivity.

7. A film scanner according to claim 4, wherein the portion of the interior surface includes a plug so arranged to be moveable to vary the depth of a cavity in the portion of the interior surface thereby varying the reflectivity.

8. A film scanner according claim 4, wherein the illumination arrangement is arranged such that light from film that reaches the array sensor that has not been scattered by imperfections derives from a portion of the interior surface of the integrator, and such that light from film that reaches the array sensor that has been scattered by imperfections derives from the remainder of the interior surface of the integrator.

9. A film scanner according to claim 8, wherein the illumination level from the image of the pupil derives from the portion of the interior surface.

10. A film scanner according to claim 9, wherein the portion of the interior surface and the remainder are illuminated by differential light sources.

* * * * *